(12) United States Patent
Williams et al.

(10) Patent No.: US 8,566,283 B2
(45) Date of Patent: Oct. 22, 2013

(54) CHANGING RECORDS ASSOCIATED WITH A SOFTWARE APPLICATION

(75) Inventors: Alexis Williams, Odessa, FL (US); Analia Mastrogiovanni, Tampa, FL (US); James Hatton, Odessa, FL (US)

(73) Assignee: salesforce.com, inc., San Francisco, CA (US)

( * ) Notice: Subject to any disclaimer, the term of this patent is extended or adjusted under 35 U.S.C. 154(b) by 474 days.

(21) Appl. No.: 12/873,243

(22) Filed: Aug. 31, 2010

(65) Prior Publication Data

US 2012/0054250 A1    Mar. 1, 2012

(51) Int. Cl.
    *G06F 17/30*    (2006.01)
(52) U.S. Cl.
    USPC ............................ 707/640; 707/638; 717/124
(58) Field of Classification Search
    USPC ................................. 707/638, 640; 717/124
    See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,903,897 A * | 5/1999 | Carrier et al. ................ 707/638 |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |

(Continued)

*Primary Examiner* — Shahid Alam (74) *Attorney, Agent, or Firm* — Ingrassia Fisher & Lorenz, P.C.

(57) ABSTRACT

A system and method for changing records associated with a software application. In one embodiment, a method includes receiving a change command to change a record type for a record that is associated with code that is submitted for integration into a software application; receiving a selection of a new record type; populating a new record format with information that is associated with the code; and receiving a save command to save the record.

17 Claims, 8 Drawing Sheets

(56) References Cited

U.S. PATENT DOCUMENTS

| | | |
|---|---|---|
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 7,698,160 B2 | 4/2010 | Beaven et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0216432 A1* | 9/2005 | Harris et al. ............ 707/1 |
| 2007/0061782 A1* | 3/2007 | Schreiner et al. ......... 717/124 |

* cited by examiner

CHANGING RECORDS ASSOCIATED WITH A SOFTWARE APPLICATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to software applications used in a database system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which, in and of themselves, may also be inventions.

In conventional database systems, users access their data resources in one logical database. A user of such a conventional system typically retrieves data from and stores data on the system using the user's own systems. A user system might remotely access one of a plurality of server systems that might in turn access the database system. Software applications used to implement database systems are routinely modified to incorporate improvements. Unfortunately, conventional means for managing modifications and recording changes to software applications can be time consuming and error prone, especially when there are numerous changes to a given software application.

BRIEF SUMMARY

Embodiments provide mechanisms and methods are provided for changing records associated with a software application. In one embodiment, a method includes receiving a change command to change a record type for a record that is associated with code that is submitted for integration into a software application; receiving a selection of a new record type; populating a new record format with information that is associated with the code; and receiving a save command to save the record.

While embodiments of the present invention may be implemented in a system having an application server providing a front end for an on-demand database service capable of supporting multiple tenants, the present invention is not limited to multi-tenant databases or deployment on application servers. Embodiments may be practiced using other database architectures, i.e., ORACLE®, DB2® by IBM and the like, without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

FIG. 7 illustrates an example page showing the information displayed in a new record format corresponding to the new record type.

DETAILED DESCRIPTION

General Overview

Systems and methods are provided for changing records associated with a software application.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for changing records associated with a software application will be described with reference to example embodiments.

System Overview

Figure 1:
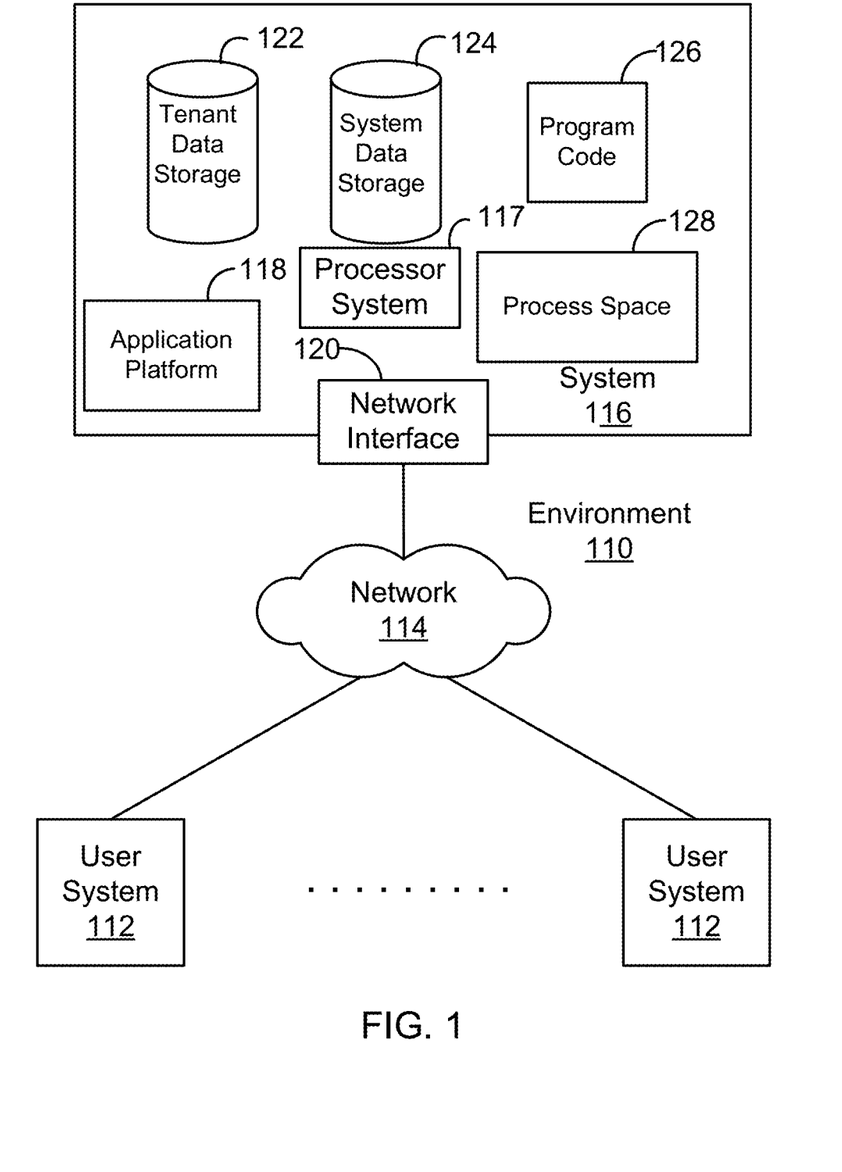
FIG. 1 illustrates a block diagram of an example environment wherein a database service might be used, and which may be used to implement embodiments described herein.

FIG. 1 illustrates a block diagram of an example environment 110 wherein a database service might be used, and which may be used to implement embodiments described herein. Environment 110 may include user systems 112, network 114, system 116, processor system 117, application platform 118, network interface 120, tenant data storage 122, system data storage 124, program code 126, and process space 128. In other embodiments, environment 110 may not have all of the components listed and/or may have other elements instead of, or in addition to, those listed above.

Environment 110 is an environment in which an on-demand database service exists. User system 112 may be any machine or system that is used by a user to access a database user system. For example, any of user systems 112 can be a handheld computing device, a mobile phone, a laptop computer, a work station, and/or a network of computing devices. As illustrated in FIG. 1 (and in more detail in FIG. 2) user systems 112 might interact via a network 114 with an on-demand database service, which is system 116.

An on-demand database service, such as system 116, is a database system that is made available to outside users who do not need to necessarily be concerned with building and/or maintaining the database system, but instead may be available for more general use when the users need the database system (e.g., on the demand of the users). Some on-demand database services may store information from one or more tenants stored into tables of a common database image to form a multi-tenant database system (MTS). Accordingly, "on-demand database service 116" and "system 116" will be used interchangeably herein. A database image may include one or more database objects. A relational database management system (RDMS) or the equivalent may execute storage and retrieval of information against the database object(s). Application platform 118 may be a framework that allows the applications of system 116 to run, such as the hardware and/or software, e.g., the operating system. In an embodiment, on-demand database service 116 may include an application platform 118 that enables creating, managing, and executing one or more applications developed by either provider of the on-demand database service, users accessing the on-demand database service via user systems 112, or third party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system has the capacities allotted to that salesperson. However, while an administrator is using that user system to interact with system 116, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 114 is any network or combination of networks of devices that communicate with one another. For example, network 114 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 112 might communicate with system 116 using TCP/IP and, at a higher network level, use other common Internet protocols to communicate, such as hypertext transfer protocol (HTTP), file transfer protocol (FTP), Andrew file system (AFS), wireless application protocol (WAP), etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least for the users that are accessing that server, each of the plurality of servers has access to the MTS' data; however, other alternative configurations may be used instead.

In one embodiment, system 116, shown in FIG. 1, implements a web-based customer relationship management (CRM) system. For example, in one embodiment, system 116 includes application servers configured to implement and execute CRM software applications as well as provide related data, code, forms, webpages and other information to and from user systems 112. In addition, system 116 includes application servers configured to store to, and retrieve from, a database system related data, objects, and Webpage content. With a multi-tenant system, data for multiple tenants may be stored in the same physical database object. However, tenant data typically is arranged so that data of one tenant is kept logically separate from that of other tenants so that one tenant does not have access to another tenant's data, unless such data is expressly shared. In certain embodiments, system 116 implements applications other than, or in addition to, a CRM application. For example, system 116 may provide tenant access to multiple hosted (standard and custom) applications, including a CRM application. User (or third party developer) applications, which may or may not include CRM, may be supported by the application platform 118, which manages creation, storage of the applications into one or more database objects, and executing of the applications in a virtual machine in the process space of the system 116.

One arrangement for elements of system 116 is shown in FIG. 1, including a network interface 120, application platform 118, tenant data storage 122 for tenant data 123, system data storage 124 for system data 125 accessible to system 116 and possibly multiple tenants, program code 126 for implementing various functions of system 116, and a process space 128 for executing MTS system processes and tenant-specific processes, such as running applications as part of an application hosting service. Additional processes that may execute on system 116 include database indexing processes.

Several elements in the system shown in FIG. 1 include conventional, well-known elements that are explained only briefly here. For example, each user system 112 could include a desktop personal computer, workstation, laptop, PDA, cell phone, or any wireless access protocol (WAP) enabled device or any other computing device capable of interfacing directly or indirectly to the Internet or other network connection. User system 112 typically runs an HTTP client, e.g., a browsing program, such as Microsoft's Internet Explorer browser, Netscape's Navigator browser, Mozilla FireFox, Opera's browser, or a WAP-enabled browser in the case of a cell phone, PDA or other wireless device, or the like, allowing a user (e.g., subscriber of the multi-tenant database system) of user system 112 to access, process and view information, pages and applications available to it from system 116 over network 114. Each user system 112 also typically includes one or more user interface devices, such as a keyboard, a mouse, trackball, touch pad, touch screen, pen or the like, for interacting with a graphical user interface (GUI) provided by the browser on a display (e.g., a monitor screen, liquid crystal display (LCD) monitor, etc.) in conjunction with pages, forms, applications and other information provided by system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application(s) including computer code to run using a central processing unit such as processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read-only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 116 is configured to provide webpages, forms, applications, data and media content to user (client) systems 112 to support the access by user systems 112 as tenants of system 116. As such, system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object oriented database management system (OODBMS) or rational database management system (RDBMS)) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
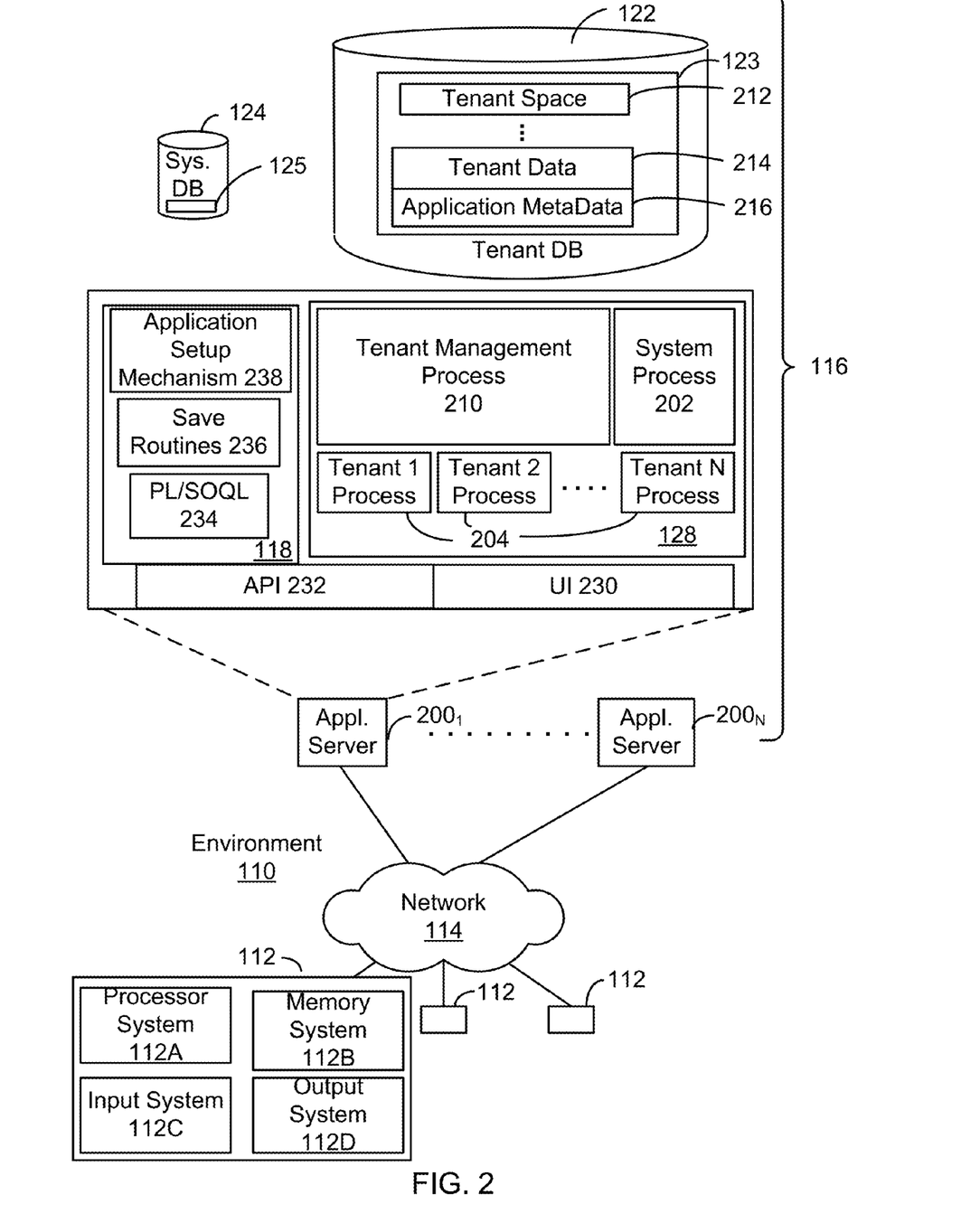
FIG. 2 illustrates a block diagram of another example environment 110, which may be used to implement embodiments described herein.

FIG. 2 illustrates a block diagram of another example environment 110, which may be used to implement embodiments described herein. FIG. 2 also illustrates elements of system 116 and various interconnections, according to one embodiment. FIG. 2 shows that user system 112 may include processor system 112A, memory system 112B, input system 112C, and output system 112D. FIG. 2 shows network 114 and system 116. FIG. 2 also shows that system 116 may include tenant data storage 122, tenant data 123, system data storage 124, system data 125, user interface (UI) 230, application program interface (API) 232, PL/Salesforce.com object query language (PL/SOQL) 234, save routines 236, application setup mechanism 238, applications servers 200$_1$-200$_N$, system process space 202, tenant process spaces 204, tenant management process space 210, tenant storage area 212, user storage 214, and application metadata 216. In other embodiments, environment 110 may not have the same elements as those listed above and/or may have other elements instead of, or in addition to, those listed above.

User system 112, network 114, system 116, tenant data storage 122, and system data storage 124 were discussed above in FIG. 1. Regarding user system 112, processor system 112A may be any combination of one or more processors. Memory system 112B may be any combination of one or more memory devices, short term, and/or long term memory. Input system 112C may be any combination of input devices, such as one or more keyboards, mice, trackballs, scanners, cameras, and/or interfaces to networks. Output system 112D may be any combination of output devices, such as one or more monitors, printers, and/or interfaces to networks. As shown in FIG. 2, system 116 may include a network interface 120 (of FIG. 1) implemented as a set of HTTP application servers 200, an application platform 118, tenant data storage 122, and system data storage 124. Also shown is system process space 202, including individual tenant process spaces 204 and a tenant management process space 210. Each application server 200 may be configured to tenant data storage 122 and the tenant data 123 therein, and system data storage 124 and the system data 125 therein to serve requests of user systems 112. The tenant data 123 might be divided into individual tenant storage areas 212, which can be either a physical arrangement and/or a logical arrangement of data. Within each tenant storage area 212, user storage 214 and application metadata 216 might be similarly allocated for each user. For example, a copy of a user's most recently used (MRU) items might be stored to user storage 214. Similarly, a copy of MRU items for an entire organization that is a tenant might be stored to tenant storage area 212. A UI 230 provides a user interface and an API 232 provides an application programmer interface to system 116 resident processes and to users and/or developers at user systems 112. The tenant data and the system data may be stored in various databases, such as one or more Oracle™ databases.

Application platform 118 includes an application setup mechanism 238 that supports application developers' creation and management of applications, which may be saved as metadata into tenant data storage 122 by save routines 236 for execution by subscribers as one or more tenant process spaces 204 managed by tenant management process 210, for example. Invocations to such applications may be coded using PL/SOQL 234 that provides a programming language style interface extension to API 232. Invocations to applications may be detected by one or more system processes, which manage retrieving application metadata 216 for the subscriber, making the invocation and executing the metadata as an application in a virtual machine.

Each application server 200 may be communicably coupled to database systems, e.g., having access to system data 125 and tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer control protocol and Internet protocol (TCP/IP) are typical protocols for communicating between application servers 200 and the database system. However, it will be apparent to one skilled in the art that other transport protocols may be used to optimize the system depending on the network connection used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5 Big-IP load balancer) is communicably coupled between the application servers 200 and the user systems 112 to distribute requests to the application servers 200. In one embodiment, the load balancer uses a least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, system 116 is multi-tenant, wherein system 116 handles the storage of, and access to, different objects, data and applications across disparate users and organizations.

As an example of storage, one tenant might be a company that employs a sales force where each salesperson uses system 116 to manage his or her sales process. Thus, a user might maintain contact data, leads data, customer follow-up data, performance data, goals and progress data, etc., all applicable to that user's personal sales process (e.g., in tenant data storage 122). In an example of an MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 116 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 116 might also maintain system level data usable by multiple tenants or other data. Such system level data might include industry reports, news, postings, and the like that are sharable among tenants.

In certain embodiments, user systems 112 (which may be client systems) communicate with application servers 200 to request and update system-level and tenant-level data from system 116 that may require sending one or more queries to tenant data storage 122 and/or system data storage 124. System 116 (e.g., an application server 700 in system 116) automatically generates one or more structured query language (SQL) statements (e.g., one or more SQL queries) that are designed to access the desired information. System data storage 124 may generate query plans to access the requested data from the database.

In one embodiment, software applications used to implement the database aspects described above are routinely modified for a variety of reasons, which improve database functionality and database services provided to end-user customers. For example, as described in more detail below, code changes referred to as user stories adds new functionality to a given software application. Code changes referred to as bug fixes repair defects in a given software application. As described in more detail below, system 116 may provide numerous records associated with user stories and bug fixes, where each record enables a user (e.g., end-user customer, developer, release manager, etc.) to track for the fulfillment of change requests associated with a given software application release. Embodiments below also enable users to change records as needed. Such records provide visibility to the many and continual changes to a given software application, which reduces human error and provides increased accountability. Other benefits include enabling users to provide developers and managers with immediate feedback as to user stories and bug fixes. The following describes embodiments that integrate such code changes to a software application.

Figure 3:
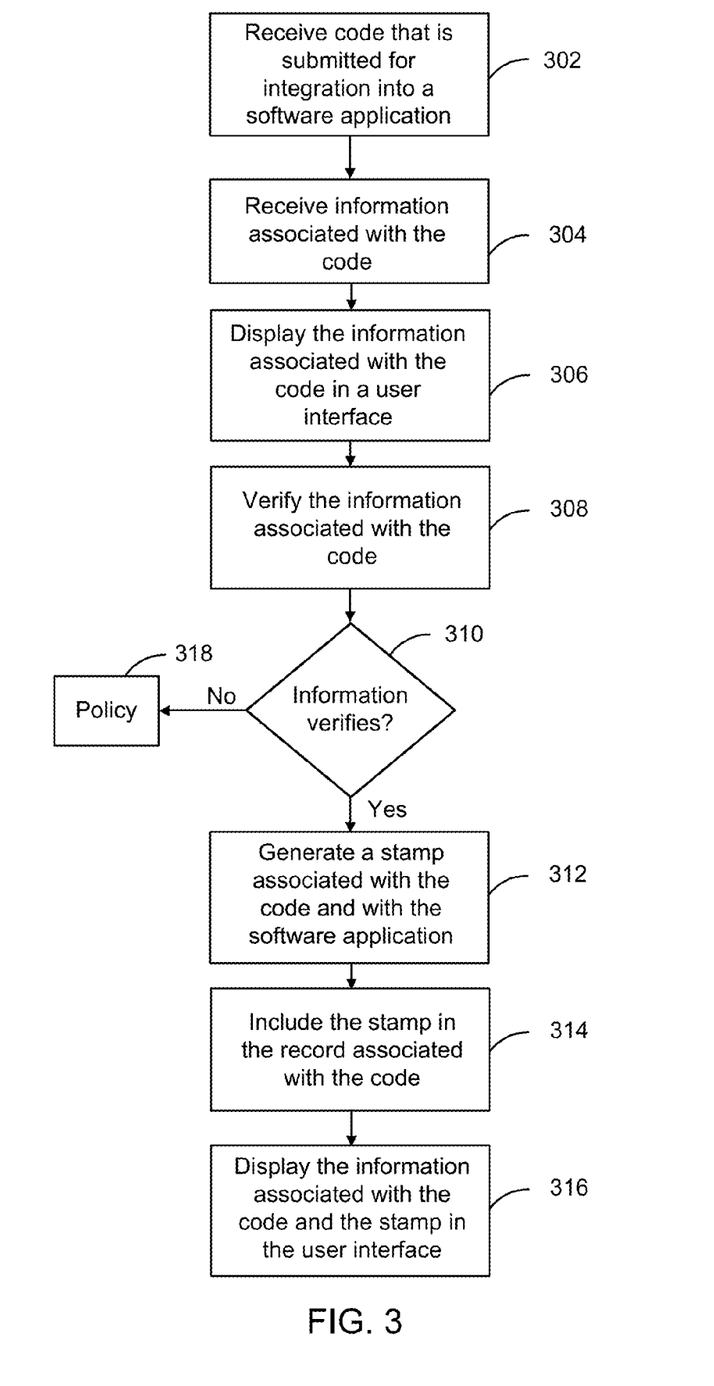
FIG. 3 illustrates an example simplified flow diagram for integrating code into a software application.

FIG. 3 illustrates an example simplified flow diagram for integrating code into a software application. Referring to both FIGS. 2 and 3, the method is initiated in block 302, where system 116 receives code that is submitted by a user for integration into a software application. While system 116 is described as performing the steps as described in the embodiments herein, any suitable component or combination of components of system 116 may perform the steps described. For example, the steps may be performed by processor system 117 or process space 128 of FIG. 1, by system process 202 of FIG. 2, or by any other suitable processor or processors associated with system 116.

In one embodiment, system 116 is a database system that implements a cloud platform. As described in more detail below, system 116 enables the user to interact with a cloud platform to submit and track code to be integrated into a software application. In one embodiment, the received code is for a particular release of the software application (e.g., gus 2.17). System 116 may receive multiple builds of code for multiple changes to the application. Embodiments described herein apply to each submission of code. In one embodiment, the software application is implemented on the cloud platform of system 116.

In one embodiment, the user may be one or more people assigned to code, which may include, for example, one or more developers who wrote the code, one or more release managers, one or more quality engineers, one or more technical writers adding documentation, etc. Note that the terms "submit" and "check in" are used interchangeably. Also, the terms "application," "software application," and "software package" are used interchangeably. In one embodiment, the user may input the code via an input system such as input system 112C of FIG. 2 or via any other suitable input system. In one embodiment, the submission of the code is facilitated by an Agile system or by a source control system (e.g., system 116) interacting with the Agile system.

In one embodiment, a script is used to submit or check in the code. In one embodiment, the script used may be a perl script (e.g. "gus.pl"). Furthermore, in one embodiment, a check-in tool such as Perforce (P4) may be used to enable the user check in the code.

In block 304, system 116 receives information associated with the code. For example, in one embodiment, the information may include a description of the code, the date the record was opened, the date that the code was submitted, who wrote the code, the purpose of the code, a URL of the code (e.g., https://gus.soma.salesforce.com/a0MB0000000GPAV), and a reviewer of the code in the form of an annotation (e.g., @reviewer@). This information may be referred to as a change list.

As indicated above, the purpose of the code may be to provide a change to the software application. For example, in one embodiment, the code may be code for new functionality that is added to the software application, in which case the code may be referred to a "user story." An example of added functionality may be a special field that is used to store information for generating a report. In one embodiment, the code may be code for a fix to a bug, in which case the code may be referred to a "bug fix." In one embodiment, a bug may be a problem found within the software application, where the problem may be associated with the original application or may be associated with a user story.

In one embodiment, system 116 enters the information associated with the code into a record, which is created when system 116 receives a request for a user story or for a bug fix. In one embodiment, a given record has multiple states. For example, system 116 may deem the record to be open when the record is created and the request (e.g., for a user story or bug fix) has not yet been fulfilled. After the request is fulfilled (e.g., user story or bug fix completed), system 116 may deem the record to be closed.

In block 306, system 116 displays the information associated with the code in a user interface. In one embodiment, the information described above (e.g., change list information) is displayed. Other information may also be displayed. For example, in one embodiment, system 116 may display a link to the build environment and/or a link to more information, which may include information from a system that is external to system 116. System 116 may also display differences between the submitted code and any previous version of that particular code.

In block 308, system 116 verifies the information associated with the code. In one embodiment, this verification is associated with Sarbanes Oxley (SOX) compliance. For example, in one embodiment, system 116 verifies multiple attributes associated with the code. For example, system 116 verifies that the code is for the right type of record (e.g., the code is either a user story or a bug fix), that the status of the record is in the correct state (e.g., open), the developer who is checking in the code is approved (e.g., part of a scrum team or assigned to the record), if the schedule build is current, etc. In certain embodiments, verification may be based on other standards in addition to or in lieu of SOX compliance.

In block 310, if the information associated with the code successfully verifies, system 116 generates a stamp associated with the code and with the software application, in block 312. In one embodiment, the stamp is associated with a particular release of the software application. In one embodiment, the stamp may be defined as a relationship between a particular release of an application and a change (e.g., user story or bug fix) that has code associated with the application. In one embodiment, each user story or bug fix may have a stamp that identifies the user story or bug fix and its associated application release (e.g., gus 2.17, gus 2.18, etc.). In one embodiment, a stamp may be represented by an alphanumeric string.

In block 314, system 116 includes the stamp in the record associated with the code. In block 316, system 116 displays the information associated with the code, including the stamp in the user interface. In one embodiment, the record provides a work record of the user story or bug fix. The work record enables a user (e.g., end-user customer, developer, release manager, etc.) to track the code that is integrated into a particular release of an application. In one embodiment, system 116 provides list of all changes that have been integrated in a given application release. In one embodiment, the record shows a reference to the code and the information associated with the code.

In one embodiment, once the code is committed to the application, system 116 stores the code in a repository, which may be stored in system database 124 of FIG. 2 or any other suitable storage location.

In one embodiment, once a record or group of records have been stamped, updates, edits, transfers or copies of the one or more records from one release to another may be allowed. In one embodiment, such manipulation of stamped records may be limited to particular individuals or groups of individuals (e.g., release managers). This feature enables modifications to existing application releases for different customers or environments (e.g., data centers, etc.). Such modifications also enables a given application release to revert to a previous version for various reasons (e.g., request of an end-user customer, etc.).

In one embodiment, system 116 may provide particular individuals (e.g., developers, managers, customers, etc.) with updates or status notifications with regard to one or more changes to the application so that these individuals may view the changes. As such, system 116 enables a user (e.g., end-user customer, developer, release manager, etc.) to track changes implemented by the code via a cloud computing environment.

In block 318, system 116 may perform one or more actions according to a predefined policy if the information associated with the code does not successfully verify. In one embodiment, the information associated with the code does not verify if the information is not SOX compliant. For example, in one embodiment, a policy may be such that system 116 notifies the user (e.g., developer) so that the user can make appropriate corrections to the code or information associated with the code. In one embodiment, the notification may indicate missing information (e.g., reviewer of the record not indicated) or invalid information (e.g., record is closed).

Figure 4:
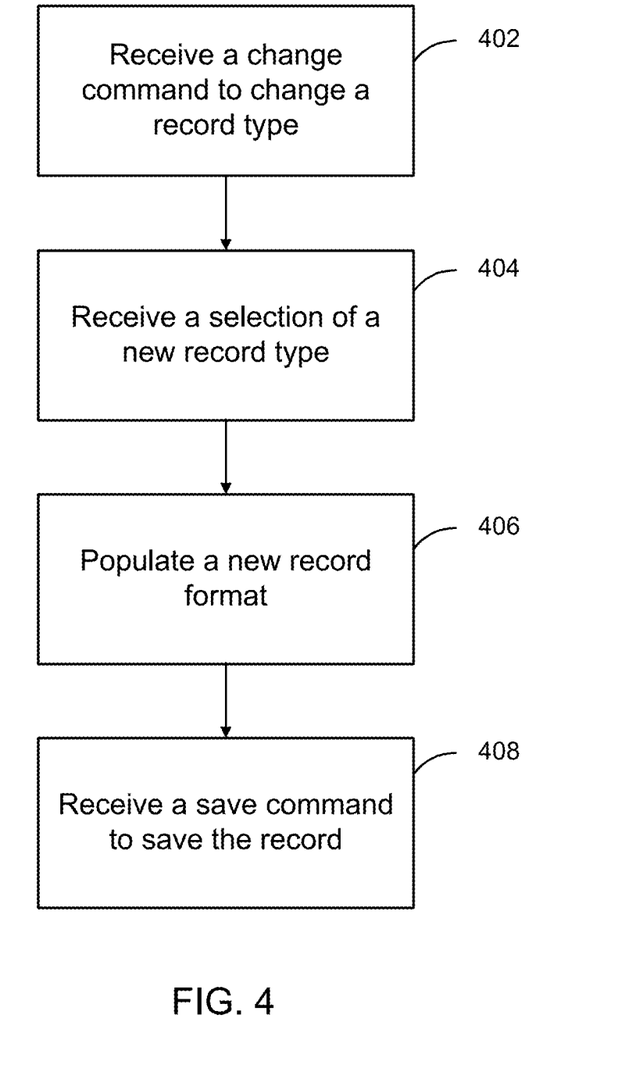
FIG. 4 illustrates an example simplified flow diagram for changing records associated with a software application.
Figure 5:
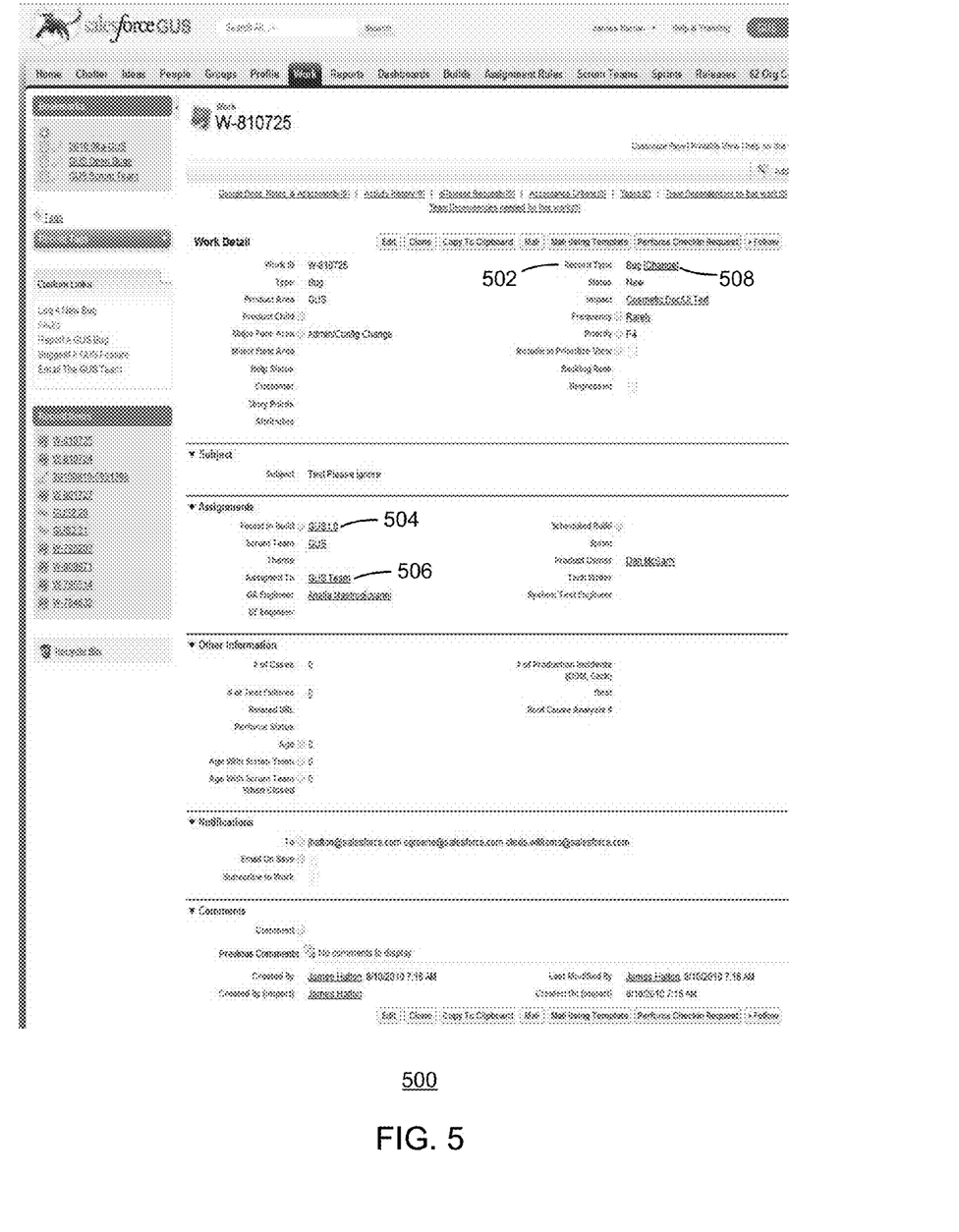
FIG. 5 illustrates an example page showing information for a record where the record type is designated as a bug fix.

FIG. 4 illustrates an example simplified flow diagram for changing records associated with a software application. Referring to both FIGS. 2 and 4, the method is initiated in block 402, where system 116 receives a change command to change a record type for a record that is associated with code that is submitted for integration into a software application. As indicated above, code that is submitted for integration into a software application may serve different purposes (e.g., bug fix, user story, etc.). A record type may need to be changed for various reasons. For example, an end user may request new functionality, but may view the need as a shortcoming of the software application and may erroneously indicate the need as a bug fix, as opposed to a user story. The record type may need to be changed for any number of reasons determined by an administrator or manager. For example, having erroneously designated record types, such as bug fixes, can artificially inflate a team's bug count. Also, a record-type determination may be a matter of opinion. For example, a given record type that is designated as a user story may need to be changed, because a team or senior manager determines that the record type should be designated as a bug fix. Record type conversion allows teams to convert between different types of work, the most common conversion being to convert a bug fix to a user story. FIG. 5 illustrates an example page 500 showing information for a record where the record type is designated as a bug fix (labeled "Bug" 502). In one embodiment, the information is displayed in a record format that corresponds to the bug-fix type record. As FIG. 5 shows, the record displays a variety of information associated with the code submitted for integration into the software application. Such information may include, for example, build 504, assignment 506, etc. In one embodiment, system 116 may receive the change command when the user indicates, for example, by clicking on a "change" link 508. After the user clicks on the change link 508, system 116 may bring the user to a new page, such as the page shown in FIG. 6, described below.

Figure 6:
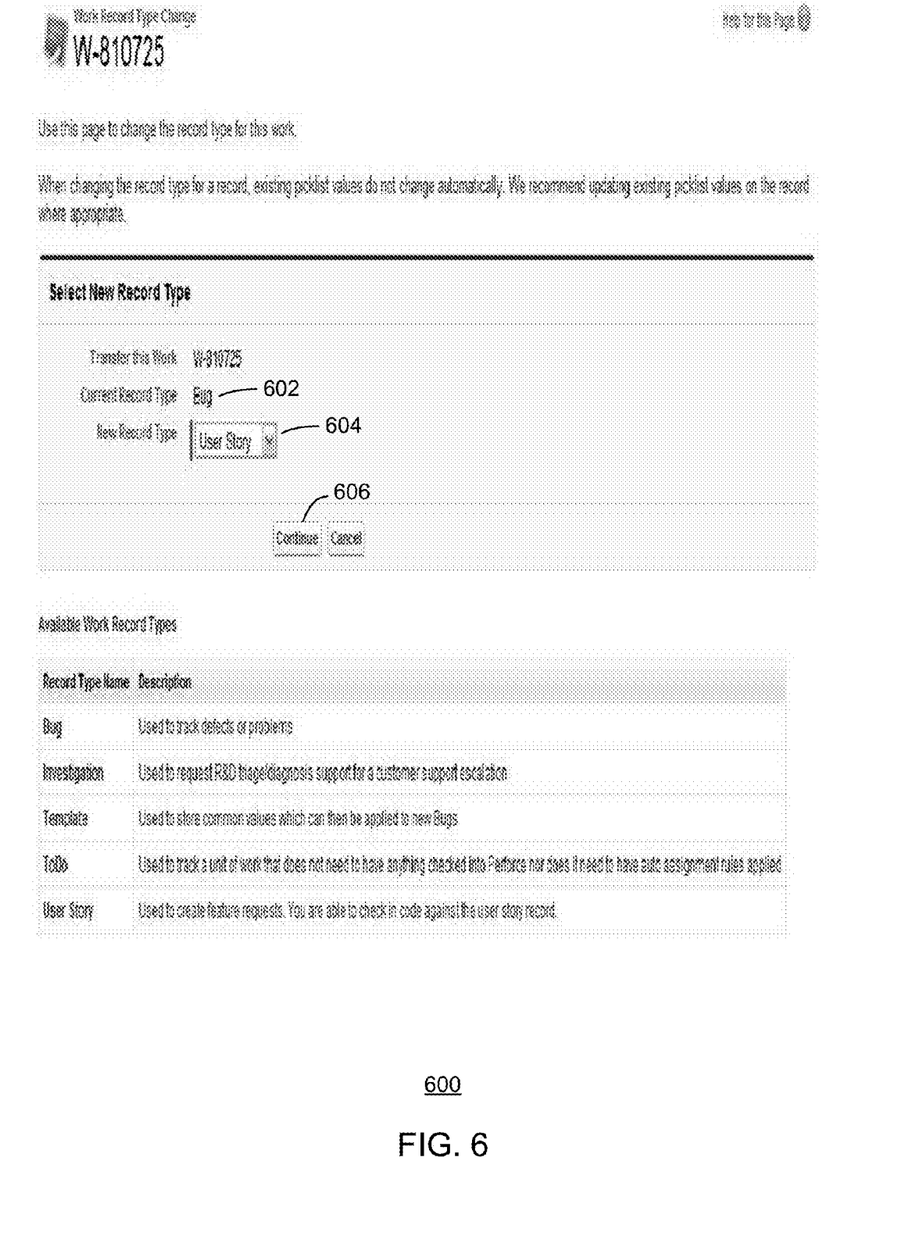
FIG. 6 illustrates an example page dedicated to receiving change commands and selections of new record types.

FIG. 6 illustrates an example page 600 dedicated to receiving selections of new record types. As FIG. 6 shows, the page indicates the current record type 602, and includes a drop-down menu 604 that the user can use to select a new record type (e.g., user story). In block 404, system 116 receives a selection of a new record type. In one embodiment, system 116 receives the selection when the user clicks on the continue button 606.

In block 406, system 116 populates a new record format with information that is associated with the code. FIG. 7 illustrates an example page 700 showing the information displayed in a new record format corresponding to the new record type (e.g., user story type). In one embodiment, the new record format is populated with information that is common to information that is associated with the old record format and the new record format. For example, system 116 transfers information such as product area 702, team 704, assignment 706, etc. from the old record format shown in FIG. 5 to the new record format shown in FIG. 7. These steps described herein save time in that they eliminate the need for a user to re-enter the information into a new record.

In one embodiment, system 116 receives additional information associated with the code. As FIG. 7 shows, page 700 includes additional fields 710, 712, 714, etc. associated with a user-story record type into which the user may enter additional information. In one embodiment, system 116 populates the new record format with the received information.

Figure 8:
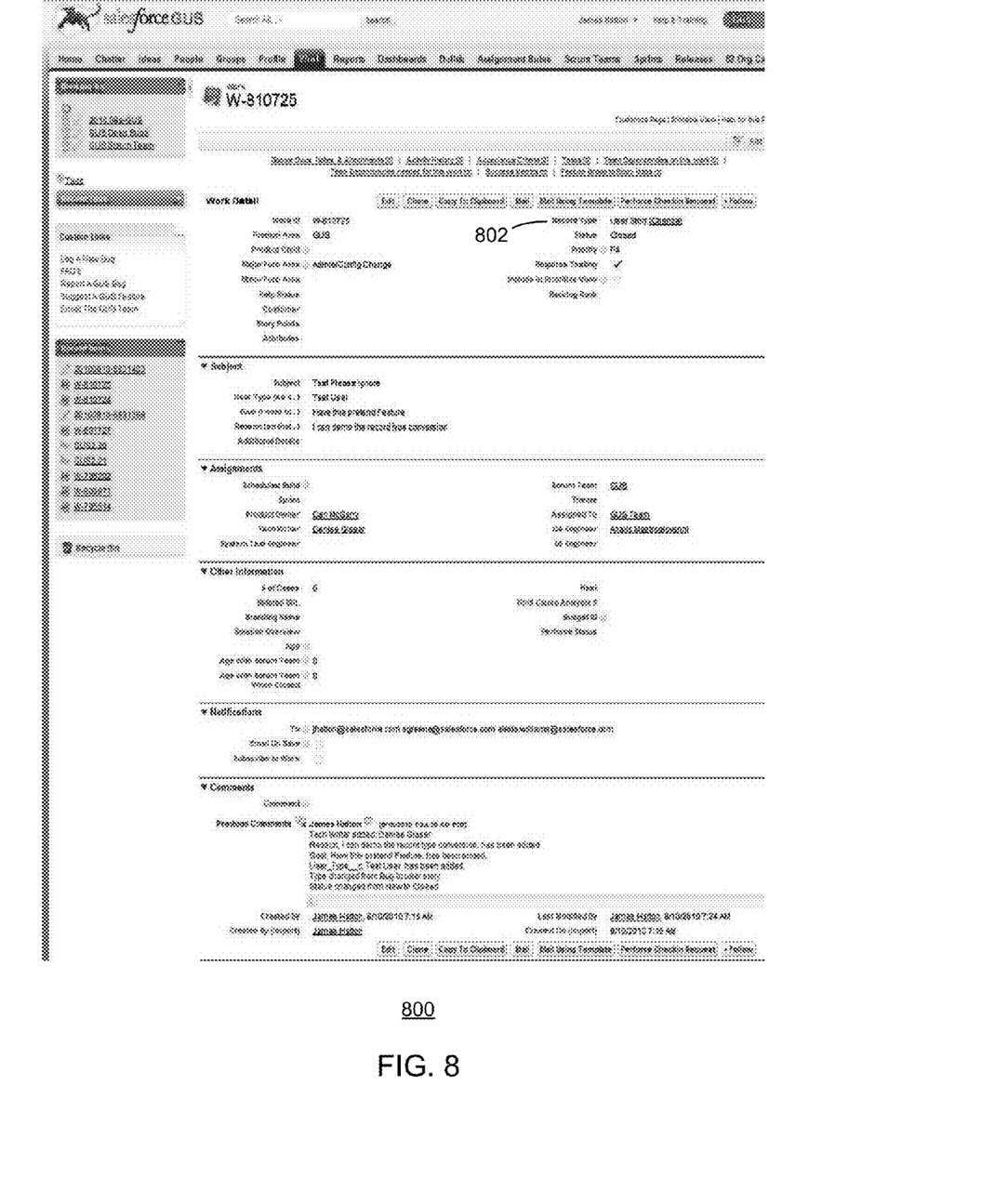
FIG. 8 illustrates an example resulting page showing the information displayed in the new record format corresponding to the new record type.

In block 408, system 116 receives a save command to save the record. As a result, the record is converted such that the record type is changed from the old record type that associates the code with a bug fix to the new record type (e.g., user story), wherein the new record type associates the code with a user story. FIG. 8 illustrates an example resulting page 800 showing the information displayed in the new record format corresponding to the new record type. As FIG. 8 shows, the record is saved as the new record type 802 (e.g., user story). Also, the record format that displays information associated with the code is changed from an old record format (e.g., corresponding to a bug-fix record type) to the new record format (e.g., corresponding to a user-story record type) and is populated with the appropriate information.

Note that while some specific examples described herein (e.g., FIGS. 5-8) have been described in the context of converting a bug-fix record type to a user-story record type, embodiments of the present invention may also apply to other conversions and still remain within the spirit and scope of the present invention. For example, embodiments described herein may convert a user-story record type to a bug-fix record type, etc.

Embodiments described herein provide numerous benefits. For example, embodiments provide visibility about work that is related to the specific builds of code. Embodiments also eliminate the need for manual analysis of an application to fix bugs. Embodiments enable the tracking of changes to applications in order to minimize human error in generating new application releases. Embodiments also enable customers to track changes in order to ensure that the changes have been integrated into a given application release, which provides accountability for fulfilling the changes. Embodiments also enable users to interact with a cloud platform to submit and track code to be integrated into applications. Embodiments also enable convenient changes to records as needed.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method comprising:
receiving, by a database system implementing a cloud platform, information associated with code submitted for integration into a software application implemented on the cloud platform, wherein the code is for new functionality that is added to the software application, the database system entering the information associated with the code into a record;
receiving, by the database system, a change command to change a record type for the record that is associated with the code;
receiving a selection of a new record type;
populating, by the database system, a new record format corresponding to the new record type with the information associated with the code that is common to the new record format to change from an old record type associating the code with a bug fix to the new record type associating the code with a user story; and
receiving a save command to save the record.

2. The method of claim 1, wherein the record type is changed from an old record type having an old record format to the new record type having the new record format, and wherein the new record format is populated with information that is common to information that is associated with the old record format and the new record format.

3. The method of claim 1, further comprising:
receiving additional information associated with the code; and
populating the new record format with the received additional information.

4. The method of claim 1, wherein the selection of the new record type is received via a page dedicated to receiving selections of new record types.

5. The method of claim 1, wherein the information associated with the code includes one or more of a description of the code, a purpose of the code, a URL of the code, a user who wrote the code, and a reviewer of the code.

6. The method of claim 1, further comprising generating, by the database system, a stamp included in the record, wherein the stamp is associated with a particular release of the software application.

7. The method of claim 1, wherein the code provides a change to the software application.

8. A non-transitory computer-readable storage medium having one or more instructions thereon for changing records associated with a software application implemented on a cloud platform of a database system, the instructions when executed by a processor causing the processor to:
enter information associated with code submitted for integration into the software application into a record, wherein the code is for new functionality that is added to the software application;
receive a change command to change a record type for the record that is associated with the code;
receive a selection of a new record type;
populate a new record format corresponding to the new record type with the information associated with the code that is common to the new record format to change from an old record type associating the code with a bug fix to the new record type associating the code with a user story; and receive a save command to save the record.

9. The computer-readable storage medium of claim 8, wherein the record type is changed from an old record type having an old record format to the new record type having the new record format, and wherein the new record format is populated with information that is associated with the old record format and the new record format.

10. The computer-readable storage medium of claim 8, wherein the instructions further cause the processor to:
receive additional information associated with the code; and
populate the new record format with the received additional information.

11. The computer-readable storage medium of claim 8, wherein the selection of the new record type is received via a page dedicated to receiving selections of new record types.

12. An apparatus for changing records associated with a software application implemented on a cloud platform of a database system, the apparatus being configured to:
enter information associated with code submitted for integration into the software application into a record, wherein the code is for new functionality that is added to the software application;
receive a change command to change a record type for the record that is associated with the code;
receive a selection of a new record type;
populate a new record format corresponding to the new record type with the information associated with the code that is common to the new record format to change from an old record type associating the code with a bug fix to the new record type associating the code with a user story; and
receive a save command to save the record.

13. The apparatus of claim 12, wherein the record type is changed from an old record type having an old record format to the new record type having the new record format, and wherein the new record format is populated with information that is common to information that is associated with the old record format and the new record format.

14. The apparatus of claim 12, wherein the instructions further cause the processor to:
receive additional information associated with the code; and
populate the new record format with the received additional information.

15. A method comprising:
receiving, by a database system implementing a cloud platform, information associated with code submitted for integration into a software application implemented on the cloud platform, wherein the code is for a fix to a bug;
receiving, by the database system, a change command to change a record type for the record that is associated with the code;
receiving a selection of a new record type;
populating, by the database system, a new record format corresponding to the new record type with the information associated with the code that is common to the new record format to change from an old record type associating the code with a user story to the new record type associating the code with a bug fix; and
receiving a save command to save the record.

16. A non-transitory computer-readable storage medium having one or more instructions thereon for changing records associated with a software application implemented on a cloud platform of a database system, the instructions when executed by a processor causing the processor to:
enter information associated with code submitted for integration into the software application into a record, wherein the code is for a fix to a bug;
receive a change command to change a record type for the record that is associated with the code;
receive a selection of a new record type;
populate a new record format corresponding to the new record type with the information associated with the code that is common to the new record format to change from an old record type associating the code with a user story to the new record type associating the code with a bug fix; and
receive a save command to save the record.

17. An apparatus for changing records associated with a software application implemented on a cloud platform of a database system, the apparatus being configured to:
enter information associated with code submitted for integration into the software application into a record, wherein the code is for a fix to a bug;
receive a change command to change a record type for the record that is associated with the code;
receive a selection of a new record type;
populate a new record format corresponding to the new record type with the information associated with the code that is common to the new record format to change from an old record type associating the code with a user story to the new record type associating the code with a bug fix; and
receive a save command to save the record.

* * * * *